US011809235B2

(12) United States Patent
Horikoshi et al.

(10) Patent No.: US 11,809,235 B2
(45) Date of Patent: Nov. 7, 2023

(54) INFORMATION APPARATUS AND DISPLAY MODULE

(71) Applicant: Lenovo (Singapore) Pte. Ltd., Singapore (SG)

(72) Inventors: Seita Horikoshi, Kanagawa (JP); Kazuo Fujii, Kanagawa (JP); Kenji Watamura, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 121 days.

(21) Appl. No.: 17/558,914

(22) Filed: Dec. 22, 2021

(65) Prior Publication Data

US 2022/0221908 A1    Jul. 14, 2022

(30) Foreign Application Priority Data

Jan. 14, 2021   (JP) ................................ 2021-004219

(51) Int. Cl.
*G06F 1/16* (2006.01)
*G09F 9/33* (2006.01)

(52) U.S. Cl.
CPC ............ *G06F 1/1656* (2013.01); *G09F 9/335* (2021.05)

(58) Field of Classification Search
CPC .... G06F 1/1656; G06F 1/1616; G06F 1/1637; G09F 9/335
See application file for complete search history.

(56) References Cited

U.S. PATENT DOCUMENTS

| | | | | |
|---|---|---|---|---|
| 9,977,467 B2* | 5/2018 | Garelli | ................. | G06F 1/1656 |
| 10,694,274 B2* | 6/2020 | Noh | ...................... | G06F 1/1652 |
| 11,054,861 B2* | 7/2021 | Bushnell | ................ | H10K 50/84 |
| 11,516,912 B2* | 11/2022 | Jeon | ....................... | G06F 1/1658 |
| 2016/0179259 A1* | 6/2016 | Watanabe | ............. | G06F 3/0446 |
| | | | | 345/174 |
| 2016/0218153 A1* | 7/2016 | Kim | ........................ | G09G 3/00 |

FOREIGN PATENT DOCUMENTS

| | | |
|---|---|---|
| JP | 2005-196170 A | 7/2005 |
| JP | 2011-165200 A | 8/2011 |
| JP | 2013-516692 A | 5/2013 |
| JP | 2020-060794 A | 4/2020 |
| JP | 2020-510263 A | 4/2020 |

* cited by examiner

*Primary Examiner* — Anthony Q Edwards
*Assistant Examiner* — Hung Q Dang
(74) *Attorney, Agent, or Firm* — Osha Bergman Watanabe & Burton LLP

(57) ABSTRACT

An information apparatus includes a display, a back face cover, and a support member. The display covers a face opposite to a display surface of the display. The support member fills a space between the face opposite to the display surface of the display and an inner face of the back-face cover.

8 Claims, 3 Drawing Sheets

INFORMATION APPARATUS AND DISPLAY MODULE

CROSS-REFERENCE TO RELATED APPLICATIONS

This application claims priority to Japanese Patent Application No. 2021-4219 filed Jan. 14, 2021, the contents of which are hereby incorporated herein by reference in their entirety.

TECHNICAL FIELD

The present invention relates to an information apparatus which has a display and a back-face cover which covers a face which is opposite to a display surface of the display and a display module.

BACKGROUND

A display chassis in the information apparatus such as a laptop PC and so forth has the display and the back-face cover which covers the face which is opposite to the display surface of the display. A small gap is present between the display and the back-face cover and the display is supported to the back-face cover by a plurality of posts (see Japanese Unexamined Patent Application Publication No. 2005-196170).

In addition, in a recent display, there are cases where an OLED (Organic Light-Emitting-Diode) is used. In general, the OLED is sandwiched between two sheets of un-tempered glass. Although a self-light-emitting type OLED is thin, it is difficult to maintain sufficient strength simply by sandwiching the self-light-emitting type OLED between the two sheets of the un-tempered glass and the self-light-emitting type OLED is reinforced by attachment of a tempered glass plate (also called top cover glass or a cover window). There are cases where a touch sensor is affixed to the tempered glass plate.

SUMMARY

Further weight saving and thinning are requested to the information apparatus. Although the tempered glass is favorable for improving the strength and for affixing the touch sensor, in a case where it is not necessary to affix the touch sensor, the tempered glass induces increases in weight and thickness against the request for weight saving and thinning.

The present invention has been made in view of the above-mentioned subject and aims to provide an information apparatus and a display module which make it possible to realize further weight saving and thinning while maintaining the strength.

An information apparatus according to one or more embodiments of the present invention includes a display, a back-face cover which covers a face which is opposite to a display surface of the display, and a support member which is formed to fill a space between the face which is opposite to the display surface of the display and an inner face of the back-face cover.

In such an information apparatus as above, it becomes possible to maintain the strength by supporting the display by the support member and the back-face cover and use of other reinforcing materials becomes unnecessary and therefore it becomes possible to realize weight saving and thinning.

In a case where the support member is made of a foaming material, further weight saving is possible and it is possible to shape the support member into a form which fits the form of the back-face cover.

Even in a case where the back-face cover is in the form of a curved surface which is convexly curved toward the face which is opposite to the display surface, it is possible to support the display by the support member.

The support member may have a first recessed portion in which a display control component which controls an operation of the display is to be arranged on the side which faces the back-face cover. It becomes possible to appropriately arrange the display control component owing to formation of the first recessed portion and it becomes also possible to make a frame body which surrounds the display thin.

The support member may have a second recessed portion in which electric wiring is to be arranged on the side which faces the back-face cover.

The display may be either a glass OLED or a plastic OLED. A self-light-emitting type OLED is thin and strength and rigidity of the self-light-emitting OLED are secured by the support member.

Even in a case where glass is not installed on the display surface of the display, it is possible to maintain the strength of the display by the support member.

In a case where the support member is one integrated component, it becomes possible for the support member to uniformly support almost the entire surface of a rear face of the display in a well-balanced state.

A display module according to one or more embodiments of the present invention is attached to a back-face cover and includes a display and a support member which is fixed to a face which is opposite to a display surface of the display, in which the support member is formed to fill a space between the face which is opposite to the display surface of the display and an inner face of the back-face cover.

Effects of the Invention

One or more embodiments of the present invention can maintain the strength of the display by supporting the display by the support member and the back-face cover and can realize weight saving and thinning because installation of other reinforcing materials becomes unnecessary.

DETAILED DESCRIPTION

In the following, an information apparatus and a display module according to preferred embodiments of the present invention will be described in detail on the basis of the drawings. Incidentally, it is to be noted that the present invention is not limited by these embodiments.

Figure 1:
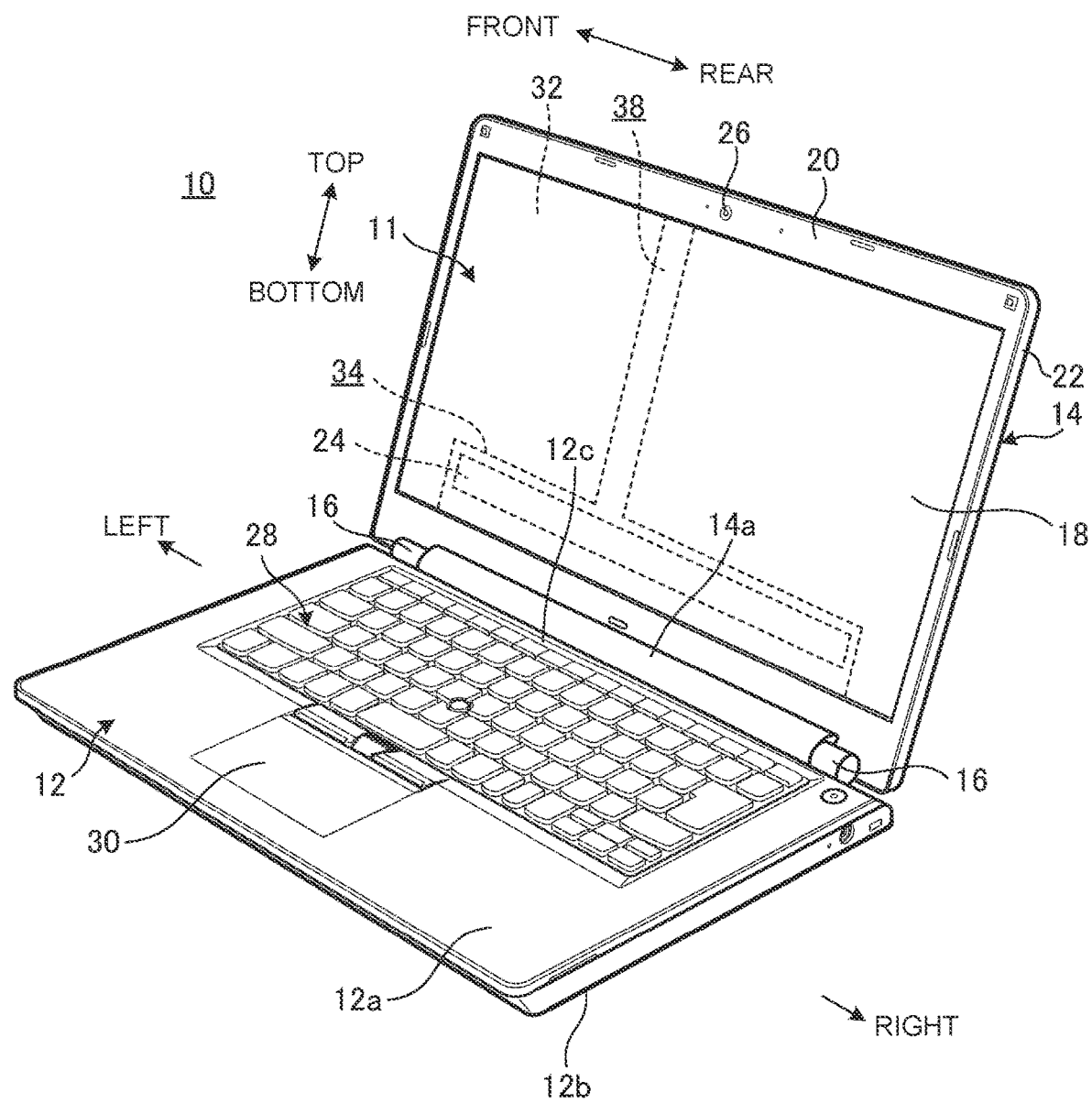
FIG. 1 is a perspective view illustrating one example of an information apparatus according to one embodiment of the present invention.

FIG. 1 is a perspective view illustrating one example of an information apparatus 10 according to one embodiment of the present invention. The information apparatus 10 includes a display module 11 according to another embodiment of the present invention. The information apparatus 10 is a laptop PC that a main body chassis 12 and a display chassis 14 are coupled together via one pair of left and right hinges 16 to be rotatably movable at respective coupling edge portions 12c and 14a. The present invention is also applicable to, for example, a display and a tablet terminal which are to be connected to a desktop personal computer, not limited to the laptop PC.

In the following, as for the display chassis 14, the display-surface side will be called a forward or front face and the opposite side thereof will be called a rear or back face. In addition, the side that the hinges 16 are installed will be called the bottom and the opposite side thereof will be called the top.

The display chassis 14 is a thin-box-shaped chassis and has a forward-face frame 20 which surrounds the forward-face side of a display 18, a back-face cover 22 which covers a face which is opposite to the display surface of the display 18 and a display controller (a display control component) 24 which is disposed between the display 18 and the back-face cover 22 and controls the operation of the display 18. Since in the information apparatus 10, at least the display controller 24 is not arranged in a part which corresponds to the forward-face frame 20, it becomes possible to make the forward-face frame 20 thin. A camera 26 is installed on a top central part of the forward-face frame 20 of the display chassis 14.

The display 18 is configured by a glass OLED or a plastic OLED. As well known in the art, the OLED spontaneously emits light by vapor-depositing an organic luminous body on a substrate and applying a voltage to the organic luminous body by a minute electrode, is capable of obtaining high brightness and contrast with low power consumption in comparison with a liquid crystal display and so forth and is excellent in visibility, response speed, lightness and so forth. In addition, since the OLED is a self-light-emitting type diode and pixels spontaneously shine in colors, installation of a backlight and a color filter becomes unnecessary and, therefore, it is easy to make the OLED thin. In the glass OLED, glass is used for its substrate and in the plastic OLED, a plastic material is used for its substrate. The display 18 which is a constitutional element of the information apparatus 10 is also a constitutional element of the display module 11. Details of the display module 11 will be described later. A glass plate which is to be used for reinforcement is not installed on the display surface of the display 18.

The display controller 24 controls the operation of the display 18 at least partially. The display controller 24 is, for example, a timing controller which controls a timing of display on the display 18. A graphics function unit, a display memory and so forth which are necessary for display control may be provided either in a main board of the main body chassis 12 or in the display controller 24. The display controller 24 is made long and thin in a crosswise direction and is installed in the vicinity of a lower end of the display chassis 14.

The main body chassis 12 is a thin box-shaped chassis and is configured by putting an upper-face cover 12a and a lower-face cover 12b together. A keyboard 28 and a touch pad 30 are installed on the upper-face cover 12a. The main board which is equipped with a CPU (Central Processing Unit) is installed in the main body chassis 12. The CPU all-inclusively controls the operation of the information apparatus 10.

Figure 2:
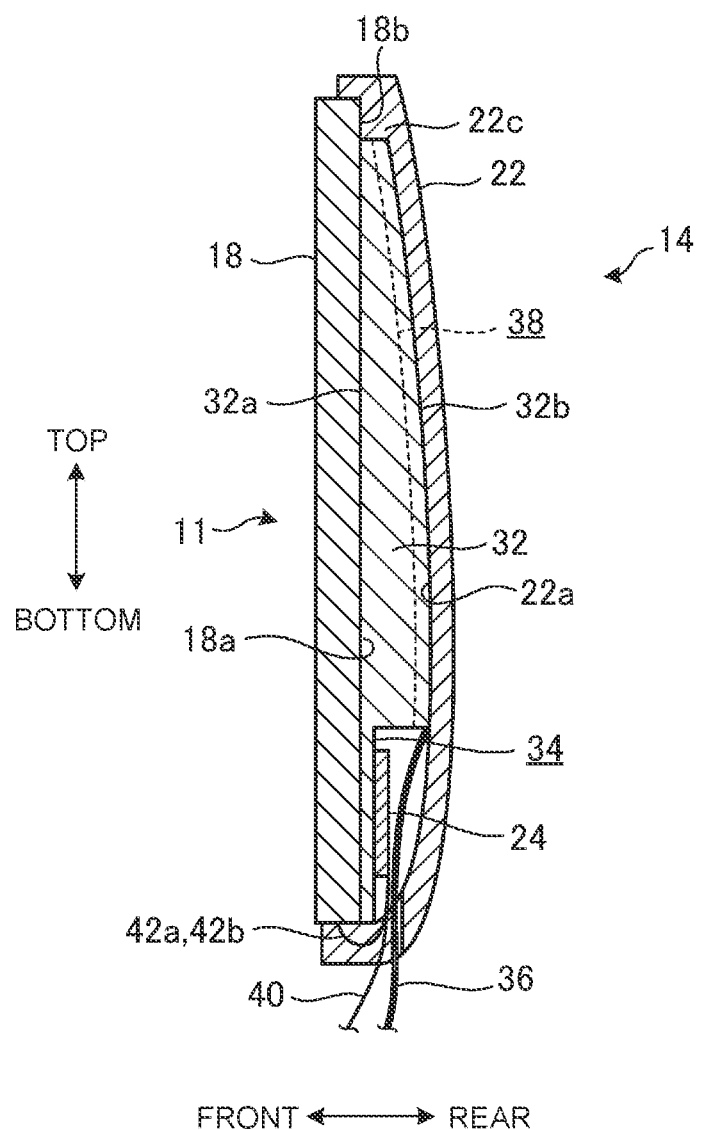
FIG. 2 is a sectional side view illustrating one example of a display chassis.
Figure 3:
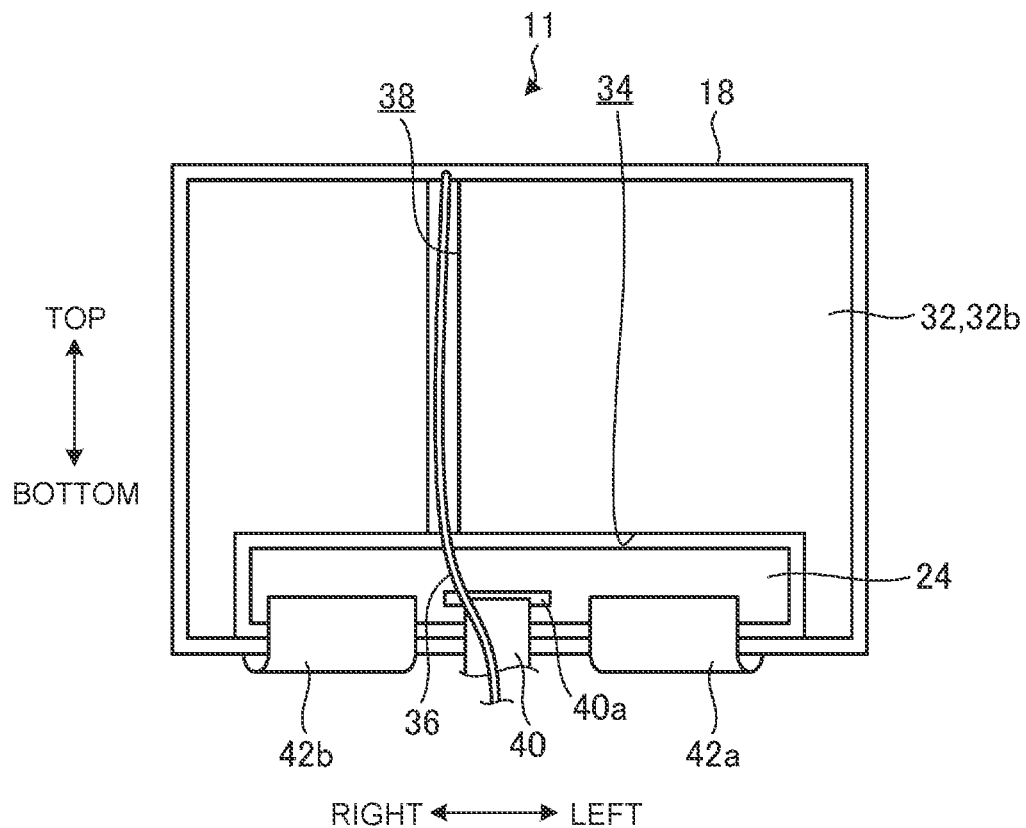
FIG. 3 is a back-face diagram illustrating one example of a display module according to another embodiment of the present invention.
Figure 4:
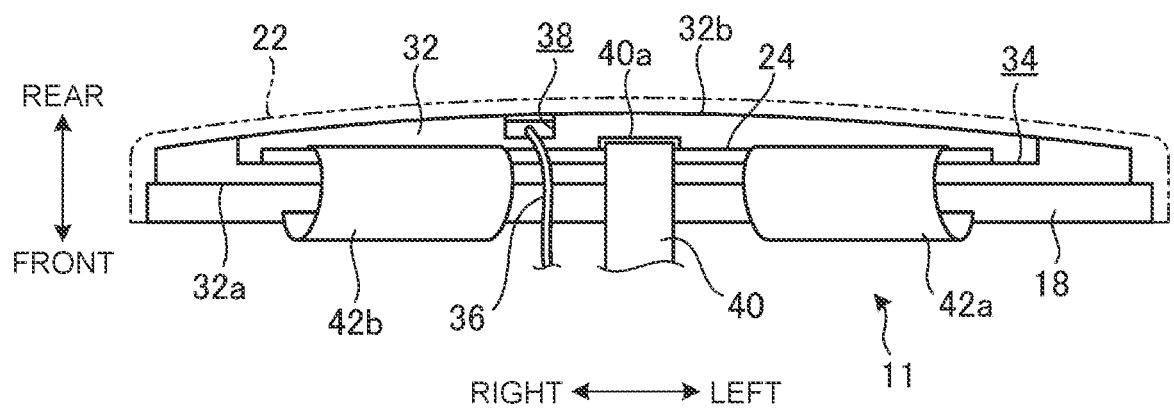
FIG. 4 is a bottom-face view illustrating one example of the display module.

FIG. 2 is a sectional side view illustrating one example of the display chassis 14. In FIG. 2, illustration of the front-face frame 20 is omitted. FIG. 3 is a back-face view illustrating one example of the display module 11. FIG. 4 is a bottom-face view illustrating one example of the display module 11.

As illustrated in FIG. 2, a support member 32 is installed in the display chassis 14. The support member 32 is fixed to a rear face 18a (that is, the face which is opposite to the display surface) of the display 18 with an adhesive, an adhesive tape or the like over an appropriately wide area and configures the display module 11 together with the display 18.

Since the display controller 24 is arranged between the display 18 and the back-face cover 22, the back-face cover 22 is in the form of a curved surface which is convexly curved toward the rear side (that is, the side which is opposite to the display surface of the display 18) in both a side view (see FIG. 2) and a bottom view (see a virtual line in FIG. 4). However, in a case where the display controller 24 is made sufficiently thin, the curved surface of the back-face cover 22 may be either almost planar or may include a completely flattened portion. The back-face cover 22 may be also formed into a flat plate depending on a design condition which is to be adopted.

The support member 32 is formed to fill almost the entire space between the face which is opposite to the display surface of the display 18 and an inner face 22a of the back-face cover 22. That is, a front face 32a of the support member 32 is a plane which extends along the rear face 18a of the display 18 and a rear face 32b of the support member 32 is a curved face which is curved along the inner face 22a of the back-face cover 22.

Incidentally, the post such as that which is described in Japanese Unexamined Patent Application Publication No. 2005-196170 is attached on condition that the base portion for attachment is basically plane and there are cases where it is difficult to attach the post in a proper orientation relative to a curved face such as the inner face 22a of the back-face cover 22. In contrast, the support member 32 which is used in the information apparatus 10 is applicable to the back-face cover 22 which is shaped into various curved faces by molding.

The support member 32 has an area which is sufficient to abut on almost the entire surface of the rear face 18a of the display 18 and supports the display 18 from behind. The display 18 is the self-light-emitting type OLED and therefore it is difficult for the display 18 to maintain sufficient strength and rigidity by itself. However, since the entire surface of the display 18 is supported by the support member 32 from the side of the rear face 18a, the sufficient strength and rigidity are maintained. Accordingly, it is not necessary to affix the glass plate to the display surface of the display 18 for the purpose of reinforcement and therefore it becomes possible to realize weight saving and thinning. In addition, since the support member 32 supports almost the entire surface of the display 18, it becomes possible to form the display 18 into a distortion-free planar shape.

Incidentally, although basically the entire surface of the rear face 18a of the display 18 is supported by the support member 32, there may exist a portion such as an end portion 18b and so forth on which the support member 32 does not abut to such an extent that strength maintenance is not hindered. A region that the support member 32 supports may be limited to, for example, a display active area and a portion which is comparable to the display active area on the display 18. The end portion 18b on which the support member 32 does not abut may be supported by a support stand 22c of the back-face cover 22. In addition, a small through-hole which is oriented in an anteroposterior direction may be formed in the support member 32 for the purpose of weight saving and so forth to such an extent that the strength maintenance is not hindered.

As illustrated in FIG. 2, FIG. 3 and FIG. 4, the support member 32 has a first recessed portion 34 in which the display controller 24 is to be arranged and a second recessed portion 38 in which electric wiring 36 is to be arranged in a rear face 32*b* which faces the back-face cover 22. Since the first recessed portion 34 and the second recessed portion 38 are provided in the rear face 32*b*, it becomes possible to widely secure an area across which the front face 32*a* is in contact with the display 18.

The first recessed portion 34 is made long in the crosswise direction so as to make it possible to arrange the display controller 24 therein and is made in a lower end of the support member 32. Although the first recessed portion 34 is shallow, the first recessed portion 34 has a depth of a degree which makes arrangement of the display controller 24 therein possible. The display controller 24 is fixed to the first recessed portion 34 with an adhesive tape and so forth.

The first recessed portion 34 is opened downward so as to make it possible to arrange FPCs (Flexible Printed Circuits) 40, 42*a* and 42*b*. The FPC 40 connects the main board in the main body chassis 12 and the display controller 24 together. The FPC 40 is connected to a substrate surface of the display controller 24 via a connector 40*a*. Since the display controller 24 is arranged in the first recessed portion 34 and the first recessed portion 34 is formed in a lower end of the support member 32, it becomes possible to make the FPC 40 short. Two FPCs 42*a* and 42*b* make 180-degree turns on a lower-end portion of the display module 11 and directly connect the display controller 24 and the display 18 together.

The second recessed portion 38 is formed in the support member 32 via the first recessed portion 34 so as to extend through the support member 32 longitudinally. The electric wiring 36 connects the main board in the main body chassis 12 and the camera 26 (see FIG. 1) together. Although the second recessed portion 38 is narrow and shallow, the second recessed portion 38 has a width and a depth of degrees which make arrangement of the electric wiring 36 therein possible. The second recessed portion 38 is a groove of a fixed depth which extends along the rear face 32*b* and has a curved shape in the side view (see FIG. 2). For this reason, the support member 32 has an appropriate thickness on its vertical central part and thereby the strength is maintained.

The support member 32 is configured by a foaming material such as epoxy foams and so forth. The foaming material which is applied to the support member 32 is hard and has a foaming ratio of, for example, about 5 times. Such a foaming material as the above is not only light-weighted but also moderately hard and therefore is preferable to support the display 18. In addition, the support member 32 is molded by using a die and it is possible to mold the rear face 32*b* into a curved face which fits a curved face of the inner face 22*a* of the back-face cover 22 and it is possible to form the first recessed portion 34 and the second recessed portion 38 in the support member 32. That is, the first recessed portion 34 and the second recessed portion 38 are formed when molding the support member 32 and it is not necessary to form the first and second recessed portions 34 and 38 later by processing.

Although the display model 11 includes the display 18 and the support member 32 as described above, the display controller 24 may be further included as a constitutional element of the display module 11. In a case where the display controller 24 is disposed in the first recessed portion 34 in advance as the constitutional element of the display module 11, it becomes easy to handle the display module 11 when fixing the display module 11 to the back-face cover 22 in a process of assembling the display chassis 14 and at the time of maintenance.

The display module 11 and the back-face cover 22 are fixed together by interposing the adhesive tape between the rear face 32*b* and the inner face 22*a*. This adhesive tape is, for example, elastic and removable and therefore it becomes possible to freely attach and detach the display module 11 by adhering and removing the adhesive tape at the time of maintenance and so forth.

Since the support member 32 is fixed to the back-face cover 22 with the adhesive tape, the display 18 is supported also by the back-face cover 22 via the support member 32. That is, the display chassis 14 has a three-layered structure which is configured by the display 18, the support member 32 and the back-face cover 22, the display 18 is supported by two layers of the support member 32 and the back-face cover 22 and therefore the sufficient strength is maintained.

As apparent from the respective drawings, the support member 32 is not a divider type member which is configured by a plurality of constitutional elements but one integrated component. By configuring the support member 32 as one integrated component, it becomes possible for the support member 32 to uniformly support almost the entire surface of the rear face 18*a* of the display 18 in the well-balanced state and no distortion occurs on the display surface because there exists no discontinuous portion in the support member 32. In addition, in a case where the support member 32 is configured as one integrated component in this way, it becomes possible to reduce the number of components and work of attaching the support member 32 to the back-face cover 22 is facilitated.

It goes without saying that the present invention is not limited to the above-described embodiments and it is possible to freely change the present invention within the range not deviating from the gist of the present invention. Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS

10: information apparatus
11: display module
12: main body chassis
14: display chassis
16: hinge
18: display
18*a*: rear face
20: forward-face frame
22: back-face cover
22*a*: inner face
24: display controller (display control component)
26: camera
32: support member 32*a*: forward face
34: first recessed portion
36: electric wiring
38: second recessed portion
40: FPC

The invention claimed is:

1. An information apparatus comprising:
a display;
a back-face cover that covers a face opposite to a display surface of the display; and
a support member including:
 a front face that extends along and is fixed to the face opposite to the display surface of the display; and
 a rear face that conforms to an inner face of the back-face cover, wherein
the support member fills a space between the face opposite to the display surface of the display and the inner face of the back-face cover, wherein
the support member has a first recessed portion in which a display control component, that controls an operation of the display, is to be disposed, and
the first recessed portion is disposed on the rear face of the support member along a peripheral lower edge that corresponds to an opening on a coupling edge portion of the back-face cover.

2. The information apparatus according to claim 1, wherein
the support member is made of a foaming material.

3. The information apparatus according to claim 1, wherein
the back-face cover is in the form of a curved surface which is convexly curved toward the face, which is opposite to the display surface.

4. The information apparatus according to claim 1, wherein
the support member has a second recessed portion in which electric wiring is to be disposed on a side which faces the back-face cover.

5. The information apparatus according to claim 1, wherein
the display is a glass OLED or a plastic OLED.

6. The information apparatus according to claim 5, wherein
glass is not installed on the display surface of the display.

7. The information apparatus according to claim 1, wherein
the support member is one integrated component.

8. A display module which is to be attached to a back-face cover, comprising:
a display; and
a support member including:
 a front face that extends along and is fixed to a face opposite to a display surface of the display; and
 a rear face configured to directly contact an inner face of the back-face cover, wherein
the support member is configured to fill a space between the face opposite to the display surface of the display and an inner face of the back-face cover
the support member has a first recessed portion in which a display control component, that controls an operation of the display, is to be disposed, and
the first recessed portion is disposed on the rear face of the support member along a peripheral lower edge that corresponds to an opening on a coupling edge portion of the back-face cover.

* * * * *